May 28, 1935.  L. HAMMOND  2,003,116
ELECTRIC CLOCK MOTOR
Filed May 9, 1932
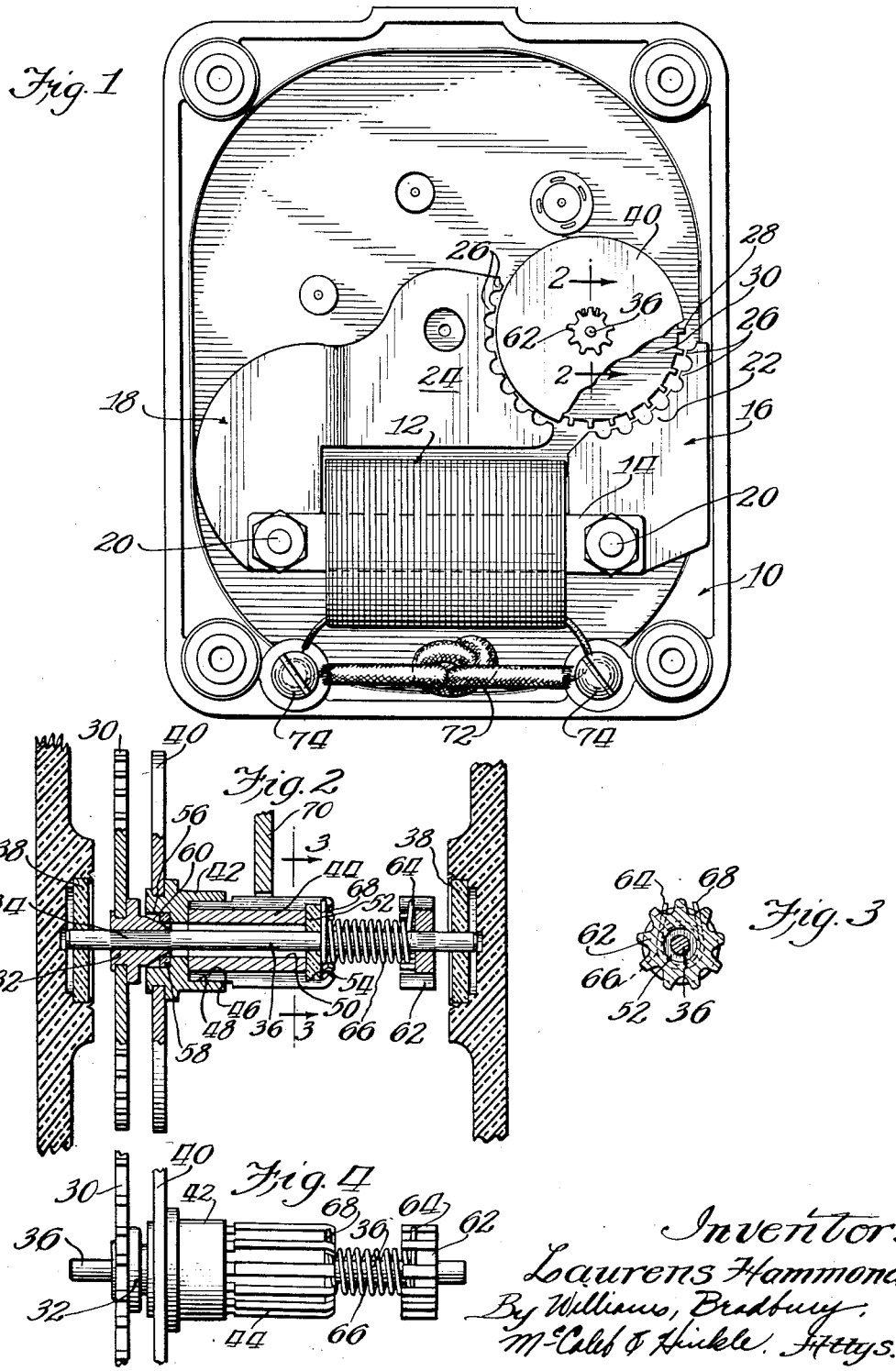
Inventor:
Laurens Hammond
By Williams, Bradbury,
McCaleb & Hinkle, Attys.

UNITED STATES PATENT OFFICE 2,003,116

ELECTRIC CLOCK MOTOR

Laurens Hammond, Chicago, Ill., assignor to The Hammond Clock Company, Chicago, Ill., a corporation of Delaware Application May 9, 1932, Serial No. 610,097

5 Claims. (Cl. 172—275)

My invention relates generally to electric clock motors, and more particularly to improvements in synchronous alternating current motors suitable for use in electric clocks and other time-keeping devices. My invention may, however, be employed in synchronous motors used for any other desired purpose.

It is an object of my invention to provide an improved synchronous alternating current motor which is quiet in operation and which is durable and of simple construction.

A further object is to provide an improved frictional inertia means for aiding a small non-self starting synchronous motor to fall in step when it reaches its synchronous speed when it decelerates from super-synchronous speed, at which it was launched.

A further object is to provide an improved construction for an inertia flywheel for synchronous motors, in which means are provided automatically to take up the wear in the bearings.

A further object is to provide an improved synchronous motor which may be economically manufactured and which will infallibly start after having been launched at a speed above its synchronous speed.

A further object is to provide an improved bearing construction for clocks and similar devices.

Other objects will appear from the following description, reference being had to the accompanying drawing, in which Figure 1 is an elevation of the front of a rear plate of a clock incorporating my improved synchronous motor, a portion of the inertia flywheel thereof being broken away to show the rotor construction;

Figure 2 is an enlarged vertical sectional view, taken on the line 2—2 of Figure 1;

Figure 3 is a transverse sectional view, taken on the line 3—3 of Figure 4, and

Figure 4 is an enlarged elevational view of the rotor shaft assembly.

As best shown in Fig. 1, the synchronous motor of my invention may be mounted upon a frame plate 10, which may be of any suitable construction but is preferably made of a phenol condensation product and constructed in a manner more fully disclosed in my co-pending application, Serial No. 562,460, filed September 12, 1931. The motor proper comprises a coil 12 which is wound upon a core 14 composed of a plurality of rectangular laminations, the ends of which are tightly secured to pole pieces 16 and 18 by means of bolts 20, the latter serving also to secure the coil, core and pole pieces to the frame 10. The pole pieces have arcuately formed pole faces 22, 24, respectively, each of which has a plurality of pole teeth 26 formed thereon. The teeth of the pole faces 22, 24, are adapted to register with the projecting pole teeth 28 formed on a rotor 30.

As best illustrated in Fig. 2, the rotor 30 is secured to a hub 32 which, in turn, is pressed over the striated portion 34 of a rotor shaft 36. The shaft 36 is mounted for rotation in a pair of bearing washers 38, which are made of a fibrous phenol condensation product and are positioned over recesses formed in the supporting frame, so as to provide a reservoir for lubricating oil.

An inertia flywheel 40 is staked to its counterbored hub 42 which is secured to a pinion 44 by a press fit over the portion 46 of the pinion, the faces of the teeth of which are ground off slightly so as to fit within the counterbore 48 in the hub 42. The pinion 44 has a bore 50 of slightly greater diameter than that of the shaft 36, the space within the bore thus forming a reservoir for lubricating oil. A bearing washer 52, preferably formed of a phenol condensation product having a fibrous material incorporated therein, is secured within a bored recess 54 formed in the end of the pinion 44 by having the ends of the teeth peened over, as shown in Fig. 2. Seated within a counterbore 56 at the other end of the pinion 44 is an annular washer 58, preferably formed of the same material as the bearing washer 52. The annular washer 58 bears against the conical surface 60 of the hub 32. A spring stop 62 is secured to the shaft 36 by being pressed over a striated portion thereof. This stop may be conveniently made of pinion stock, so that the tangentially extending end portion 64 of a combined compression and torsion spring 66 may be conveniently anchored against rotation by the stop. The other tangentially extending end 68 of the coil spring 66 is similarly anchored between two of the terminally projecting portions of the teeth of the pinion 44.

The pinion 44 is arranged to mesh with a gear 70, which may form part of the device or mechanism driven by the motor such, for example, as the high speed end of a speed-reducing gear train for use in a clock. If the motor is mounted upon a plate 10 of insulating material, the ends of the coil winding may conveniently be connected to the ends of an extension cord 72 by means of binding post screws 74 threaded in the frame plate 10.

The spring 66, as previously stated, acts both as a compression and as a torsion spring. It is under very slight compression, the compression being only sufficient to maintain the pinion assembly in its leftmost (Fig. 2) position, with the washer 58 bearing firmly upon the conical bearing surface 60 of the hub 32. Due to the fact that the bearing surface is conical, the wear is automatically taken up. Wear in the bearing 58 does not, therefore, cause the pinion and inertia wheel assembly to become loose on the rotor shaft, and vibration of the former relative to the latter is thereby eliminated, even after the motor has been in use for a considerable length of time. While it is, of course, desirable to maintain a film of oil at these bearings as well as at the bearings at the ends of the rotor shaft, it has been found that even after the oil has entirely dried up and disappeared, the bearings will function satisfactorily for a long time without permitting the parts to vibrate and cause undesirable noise.

It will be noted that the pole faces 16 and 26 are not positioned upon diametrically opposite sides of the rotor 30 but, instead, are so positioned that each will exert magnetic attraction upon the rotor in a direction having a downwardly directed component. Since the magnetic forces acting upon the rotor tend to pull the rotor and its shaft in the same direction as the gravitational forces acting upon the rotor and its associated parts, the rotor shaft will at all times be held against the lower surfaces of its bearings. While this construction may possibly slightly increase and concentrate the wear in the bearings, it has been found that the slightly increased downward pressure on the bearing surfaces does not greatly affect the useful life of the bearings, and has the great advantage that the rotor shaft does not vibrate but runs smoothly and, as a result, the motor is substantially noiseless in operation.

It will be noted that the shaft 36 is of constant diameter throughout its length, thus making it practical to use an extremely hard alloy steel in its manufacture, which may be ground in a centerless grinder with a very high degree of accuracy and thereafter polished, with the result that the shaft and the washers made of a phenol condensation product together form a remarkably durable bearing construction having a useful life very many times that of the finest steel and brass bearing, or even a steel and jewel bearing.

The bearings for the ends of the rotor shaft are provided with a lubricant containing well formed by a recess in the supporting frame plate, and this recess is closed by the bearing washer, which is made of a phenol condensation product. This construction is extremely simple and may be economically produced. The bearing washers 38, due to the material of which they are made, deaden any noise producing vibrations which may be transmitted from the shaft.

In operation, the motor is started in the usual manner by spinning it by means of an external force to a speed above its synchronous speed. When thus launched, it will decelerate gradually, due to its load, until it reaches synchronous speed, whereupon it will invariably "fall into step". At the instant at which the rotor attains its synchronous speed, there is a dissipation of energy which is in part stored up in the torsion spring 66 and in part consumed by friction, due to the relative movement of the rotor and the inertia flywheel and pinion assembly. It will be noted that the rotor drives the pinion 44 through the torsion spring 66, and that the pinion is in mesh with the gear 70 forming the high speed end of the usual gear train. This gear train may be of any desired or conventional construction such, for example, as shown in my aforesaid co-pending application, Serial No. 562,460, filed September 12, 1931.

While I have shown and described a particular embodiment of my invention, it will be apparent to those skilled in the art that various modifications in design and construction may be made without departing from the spirit of my invention.

What I claim as new and desire to secure by Letters Patent of the United States is:

1. In a synchronous motor, the combination of a shaft, a rotor fixed to said shaft and having a conical bearing surface, an inertia flywheel having a bearing surface cooperable with said conical bearing surface on said rotor, and a compression spring for pressing said inertia wheel toward said rotor to maintain the bearing surfaces thereof in contact.

2. In a synchronous alternating current motor, the combination of a rotor shaft, a rotor secured thereto, a pinion mounted for rotation on said shaft, an inertia wheel rigidly secured to said pinion, a fixed stop on said shaft, a tapered bearing between said wheel and shaft, and a compression and torsion spring encircling said shaft and having its ends anchored to said pinion and to said stop respectively.

3. In an electric clock, the combination of a rotor shaft, a rotor having a hub secured to said shaft, said hub having a tapered bearing surface, an inertia element having a counterbore therein, an annular bearing element positioned within said counterbore, said bearing element being made of a material composed in part of a phenol condensation product, a drive pinion secured to the inertia element, and resilient means to hold said annular bearing element in contact with said tapered bearing surface whereby compensation will automatically be made for wear in said bearing element by moving the latter toward the portion of said tapered bearing surface of increased diameter.

4. In an electric clock, the combination of a rotor shaft, a rotor having a hub secured to said shaft, said hub having a tapered bearing surface, an inertia element, an annular bearing element secured to said inertia element, said bearing element being made of a material composed of a fibrous material impregnated with a phenol condensation product, a drive pinion secured to the inertia element, and resilient means to hold said annular bearing element in contact with said tapered bearing surface.

5. In a synchronous alternating current motor, the combination of a rotor shaft, a rotor secured thereto, a pinion rotatable on said shaft, an inertia wheel rigidly secured to said pinion, and a compression and torsion spring having its ends anchored to said pinion and to said shaft respectively, said spring resiliently resisting relative rotational movement between said inertia wheel and said shaft, and resiliently pressing said inertia wheel and pinion in a direction longitudinally of said shaft.

LAURENS HAMMOND.